United States Patent [19]

Sandahl

[11] Patent Number: 4,864,769

[45] Date of Patent: Sep. 12, 1989

[54] BOUYANT POP-UP LINER BAIT SERVER

[76] Inventor: Irvin V. Sandahl, 422 E. Gustavus, Fergus Falls, Minn. 56537

[21] Appl. No.: 306,821

[22] Filed: Feb. 3, 1989

[51] Int. Cl.[4] ............................................. A01K 97/04
[52] U.S. Cl. ........................................ 43/55; 43/56; 220/400
[58] Field of Search ................... 43/4, 54.1, 55, 56, 43/57; 220/400, 402, 408, 409, 410, 412

[56] References Cited

U.S. PATENT DOCUMENTS

| | | |
|---|---|---|
| 724,539 | 4/1903 | Bourne . |
| 1,451,925 | 8/1922 | Ruff . |
| 1,709,424 | 9/1927 | Zohe . |
| 2,489,710 | 11/1949 | Janisch . |
| 2,531,628 | 3/1945 | Janisch . |
| 2,539,412 | 1/1951 | Faris . |
| 2,594,172 | 4/1952 | Huffman et al. . |
| 2,935,858 | 5/1960 | Kingery ................................. 43/55 |
| 2,949,691 | 8/1960 | Johnson ................................ 43/55 |
| 3,344,552 | 10/1967 | Glasco . |
| 3,452,469 | 7/1969 | White ..................................... 43/55 |
| 3,550,307 | 12/1970 | Donner . |
| 3,710,502 | 1/1973 | Bracey . |
| 3,882,628 | 5/1975 | Stouder ................................. 43/55 |
| 3,903,636 | 9/1975 | Bracey . |
| 3,955,306 | 5/1976 | Handa . |
| 4,000,577 | 1/1977 | Kelley . |
| 4,030,227 | 6/1977 | Oftedahl . |
| 4,513,525 | 4/1985 | Ward et al. ........................... 43/55 |
| 4,606,143 | 8/1986 | Murphy, Jr. . |
| 4,686,788 | 8/1987 | Hartman . |
| 4,763,438 | 8/1988 | Saliaris ................................. 43/56 |

*Primary Examiner*—Nicholas P. Godici
*Assistant Examiner*—Michael William Starkweather
*Attorney, Agent, or Firm*—Merchant, Gould, Smith, Edell, Welter & Schmidt

[57] ABSTRACT

A pop-up bait server and a kit and a method for making the same. The Pop-Up Bait Server for convenient delivery of live bait kept in water contained therein, includes an outer container having an inside; an inner container fitting at least partially inside said outer container, the inner container having an inner wall and an adjoining bottom in which define an interior of the inner container; and a latch mechanism for a releasably restraining the inner container inside the outer container such that the interior is at least partially under water when the inner container is restrained in the outer container by the latch mechanism and the outer container contains an amount of water sufficient to at least partially submerge the interior within the outer container, wherein the interior can contain live bait which resides in water within the interior when the inner container is restrained by the latch mechanism inside the outer container. The inner container includes a water passage mechanism for allowing water to pass through the inner container and into and out of the interior and a buoyant mechanism for buoying the inner container such that the interior will rise when unrestrained and under water. The pop-up bait server kit includes the inner container and the latch mechanism of the present invention.

25 Claims, 2 Drawing Sheets

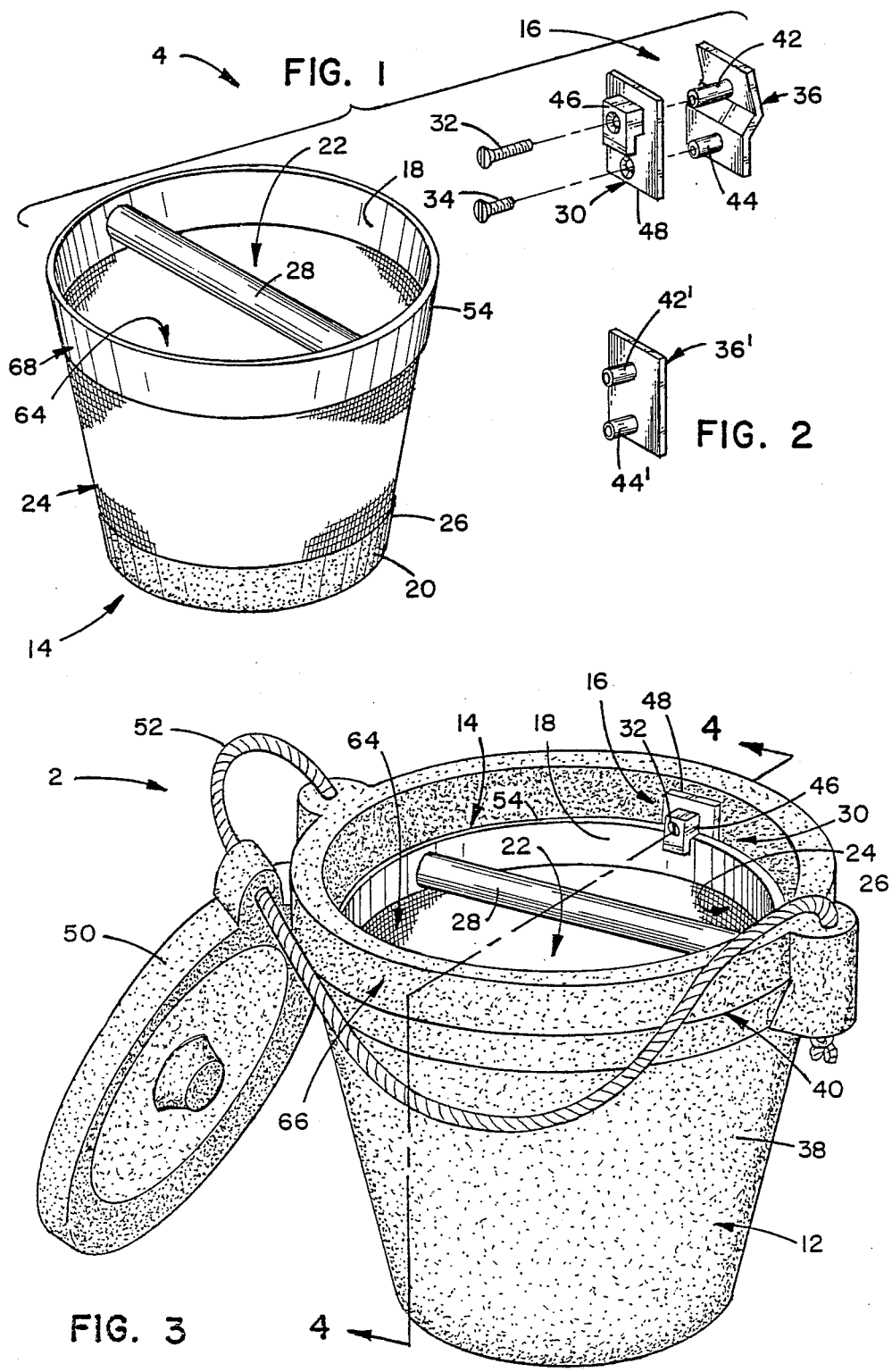

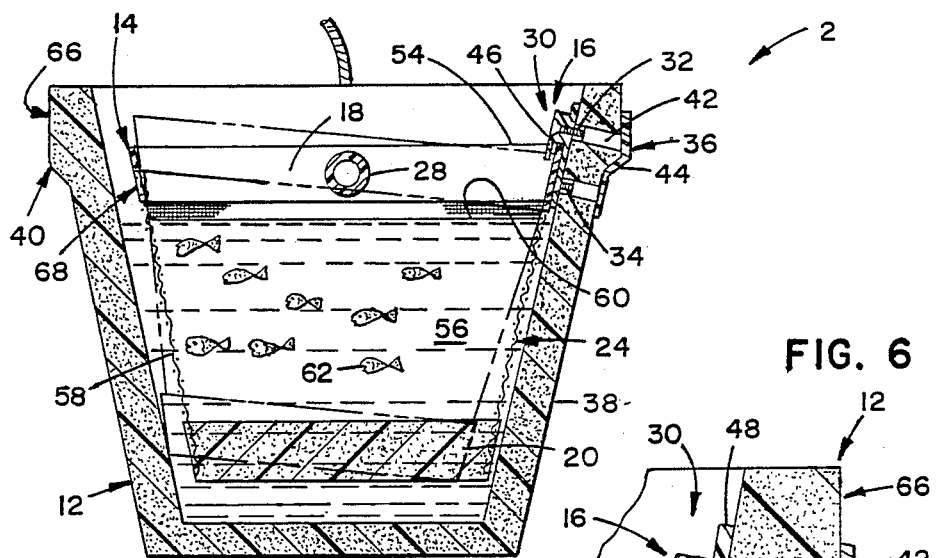
FIG. 6
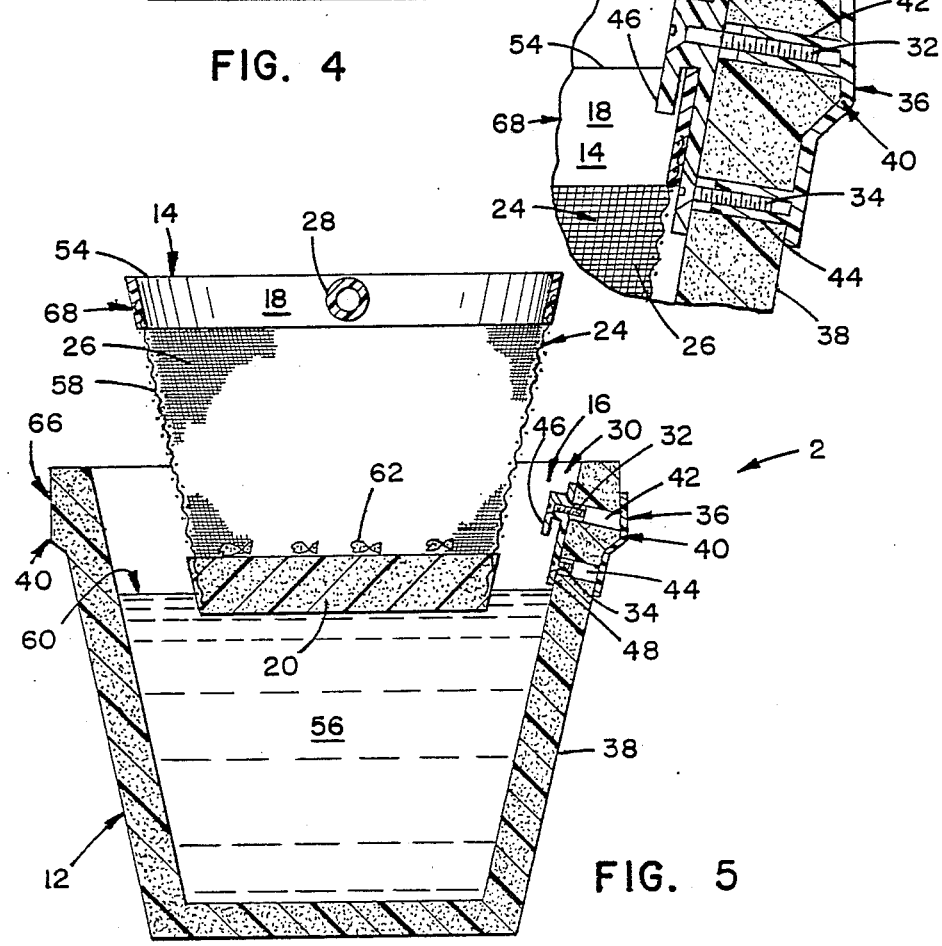
FIG. 4
FIG. 5

BOUYANT POP-UP LINER BAIT SERVER

FIELD OF THE INVENTION

The present invention generally relates to bait buckets and specifically bait buckets having outer and inner containers wherein the outer container contains water to sustain live bait and the inner container can be manipulated to raise the bait out of the water for easy access thereto.

BACKGROUND OF THE INVENTION

Bait buckets for carrying live bait are well known in the art. Pails have been used for years to hold a quantity of water containing minnows, leeches and the like, which must be kept in water in order to preserve their greatest usefulness as bait. When live bait is free in the water, however, it can be quite difficult to catch the bait because it can elude one's reach. In addition, it is generally necessary to put at least a hand, and probably a forearm, into the water in order to capture the live bait. This means that one may need to take time to roll up a sleeve so that it does not get wet, and because one's hand and forearm generally do get wet when the bait is retrieved from the bucket, one may feel a need to dry off after retrieving bait from the bucket, especially in cold and windy weather.

In order to provide a bait bucket which does not require the user to capture live bait while the bait is swimming in water, a number of bait buckets have been made which include an outer container and an inner container having water passage means for allowing water to pass into and out of the interior of the inner container so that the inner container can be removed from the outer container leaving the water behind but retaining the live bait so that bait may be easily selected without putting one's hand and forearm into the water. Bait buckets of this type are exemplified by Zohe (U.S. Pat. No. 1,709,424), Janish (U.S. Pat. Nos. 2,849,710 and 2,531,628), Faris (U.S. Pat. No. 2,539,412), Huffman, et al. (U.S. Pat. No. 2,594,172), Glasco (U.S. Pat. No. 3,344,552), Donner (U.S. Pat. No. 3,550,307), and Bracey (U.S. Pat. Nos. 3,710,502 and 3,903,636).

Unfortunately, it generally takes two hands to manipulate bait buckets of this kind in order to retrieve one's bait. The inner container must be lifted or otherwise manipulated with one hand, while the bait is retrieved with the other hand. If the fisherman has a fishing rod to hold with one hand, it generally needs to be put down in order to select the bait.

Accordingly, a need exists for a bait bucket which can be easily manipulated with a single hand in order to select and remove live bait without putting one's hand into the water in an attempt to capture the bait. The present invention provides a solution to this and other problems and also offers other advantages over the prior art, and solves other problems associated therewith.

SUMMARY OF THE INVENTION

Accordingly, it is an object of the present invention to provide a cost effective pop-up bait server for convenient delivery of live bait kept in water contained therein. In order to achieve this object, the present inventor has developed a pop-up bait server which is inexpensive and may be manipulated with a single hand while a fisherman holds his or her fishing equipment with the other hand. The present bait server comprises an outer container having an inside; an inner container fitting at least partially inside said outer container and having an inner wall and an adjoining bottom which define an interior of said inner container, said inner container having water passage means for allowing water to pass through said inner container and into and out of said interior, said inner container having bait receiving means and buoyant means for buoying said inner container such that said interior will rise when unrestrained and under water; and latch means for releasably restraining said inner container inside said outer container such that said interior is at least partially under water when said inner container is restrained in said outer container by said latch means and said outer container contains an amount of water sufficient to at least partially submerge said interior within said outer container, wherein said interior can contain live bait which resides in an aqueous environment in the water within said interior when said inner container is restrained by said latch means inside said outer container. The inner container preferably includes handle means for lifting the inner container out of the outer container when placed therein and a plurality of openings in the inner wall such that water can pass through the inner wall while bait is retained in the interior when placed therein. Said buoyant means preferably include a confined space wherein any and all matter within said confined space has a cumulative specific gravity effective to make the inner container buoyant in water, said matter preferably including a synthetic polymer material having a specific gravity of less than about 1, most preferably a foamed polystyrene material such as Styrofoam ®, or the like.

The present invention also includes a pop-up bait server kit for use with a receptacle which can be used as an outer container to receive and retain water, said kit comprising an inner container sized to fit at least partially inside of the outer container and having an inner wall and an adjoining bottom which define an interior of said inner container, said inner container having water passage means for allowing water to pass through said inner container and into and out of said interior, said inner container having bait receiving means and buoyant means for buoying said inner container such that the interior will rise when unrestrained and under water; and latch means for releasably restraining said inner container inside the outer container such that said interior is at least partially under water when said inner container is restrained inside the outer container by said latch means and when the outer container contains an amount of water sufficient to at least partially submerge said interior within the outer container, wherein said interior can contain live bait which resides in an aqueous environment in the water within said interior when said inner container is restrained by said latch means inside the outer container.

In addition, the present invention provides a method of making a pop-up bait server for convenient delivery of live bait kept in water contained therein, said method comprising the steps of providing an inner container sized to fit at least partially inside of a receptacle used as an outer container to receive and retain water, and latch means for releasably restraining said inner container inside of the outer container, said inner container having an inner wall and an adjoining bottom which defined an interior, said inner container having water passage means for allowing water to pass through said inner container and into and out of said interior, said inner container having bait receiving means and buoyant means for buoying said inner container such that the interior will rise when unrestrained and under water; and detachably attaching said latch means to the outer container such that said latch means can releasably restrain said inner container inside the outer container when the inner container is placed inside the outer container and the outer container contains an amount of water sufficient to at least partially submerge said interior within the outer container and such that live bait can be sustained in an aqueous environment in the water in said interior when said inner container is so restrained. Said latch means preferably include securing screws, a latch portion and a backing portion. The latch portion preferably includes a lip and a support plate and the backing portion preferably includes upper and lower bosses for receiving the securing screws. The preferred latch mechanism of the present invention is preferably detachably attached to a receptacle preferably comprising a foamed polystyrene material such as Styrofoam ®, or the like, by inserting the upper and lower bosses of the backing portion through an outside wall of the outer container or receptacle in an appropriate position in an upper portion of the perimeter of the outer container. The bosses may be inserted directly into the foamed polystyrene material of the preferred embodiment or into openings for receiving the bosses which are created therein. The latch portion is subsequently attached in an appropriate position on an inside wall of the outer container by inserting the securing screws through the latch portion and into the respective bosses. The screws are then tightened to provide a securely attached latch mechanism.

The present invention provides a number of advantages for fisherman. Live bait can be kept in an aqueous environment in the water in interior of the inner container, which may be easily drained by manipulating the pop-up bait server with a single hand. When the inner container is disengaged from the latch portion, a buoyant force causes the inner container to rise or pop-up in the water, thereby enabling the water to drain out of the inner container. One can then reach into the bait server with the same hand to select live bait to attach to one's fishing line which can be held simultaneously in the other hand. It is not necessary for the fisherman to reach into the water to obtain the bait and the bait is much easier to select when it is not swimming in the water. Furthermore, when the bait has been selected and attached to the fishing line, the inner container may be easily depressed back into the water in the outer container, and the upper edge of the inner container may then be engaged in the preferred latch mechanism of the present invention, and thereby restrained in such a position as to provide an aqueous environment which will sustain the bait.

These and various other advantages and features of novelty which characterize the present invention are pointed out with particularity in the claims annexed hereto and forming a part hereof. However, for a better understanding of the present invention, its advantageous, and other objects obtained by its use, reference should be made to the drawings which form a further part hereof and to the accompanying descriptive matter, in which there is illustrate and described preferred embodiments of the present invention.

BRIEF DESCRIPTION OF THE DRAWINGS

In the drawings, in which like reference numerals indicate corresponding parts of preferred embodiments of the present invention throughout the several views, FIG. 1 is a perspective view of a kit in accordance with the present invention;

FIG. 2 is a perspective view of an alternate form of the backing portion shown in FIG. 1;

FIG. 3 is a perspective view of a pop-up bait server of the present invention, including the elements of the kit shown in FIG. 1;

FIG. 4 is a sectional view of the pop-up bait server shown in FIG. 3 and seen generally from the line 4—4;

FIG. 5 is a sectional view similar to that shown in FIG. 4, but showing the inner container in a different position relative to the outer container; and FIG. 6 is an enlarged sectional view of the portion of the pop-up bait server, generally shown in FIG. 4, proximate the backing portion.

DETAILED DESCRIPTION OF THE PREFFERRED EMBODIMENTS

Referring now to the drawings, and to FIGS. 1-3, in particular, the present invention provides a kit 4 for making a pop-up bait server 2 by using the elements of the kit 4 with a commercially available receptacle, preferably a Styrofoam ® bucket similar to the one used as an outer container 12 in the pop-up bait server 2 of the present invention shown in FIG. 3. The kit 4 includes an inner container 14 and a latch mechanism 16. The inner container 14 preferably includes an inner wall 18 and an adjoining bottom 20 which define an interior 22 of the inner container 14. The inner container 14 also includes a water passage mechanism 24, preferably a plurality of water passage openings 26 in the inner wall 18, which allow water to pass through the inner container 14, preferably through the inner wall 18, and into and out of the interior 22. The inner container 14 also includes a handle 28 which is secured, preferably bonded, to opposite portions of the inner wall 18.

The latch mechanism 16 includes a latch portion 30, first and second to securing screws 32 and 34 and a backing portion 36. The backing portion 36 is constructed so as to reciprocate the shape of the outside surface of a polystyrene foam bucket having a ridge 40 around its upper perimeter. An alternate backing portion 36' is shown in FIG. 2 for an outer container (not shown) which does not have a ridge 40 around its upper perimeter 66. The backing portion 36 includes upper and lower bosses 42 and 44 for receiving respective securing screws 32 and 34. The latch portion 30 includes a lip 46 through which the first securing screw 32 passes when it is tightened into the upper boss 42 of the backing portion 36 to secure the latch mechanism 16 on the outer container 12. The second securing screw 34 passes through a support plate 48 of the latch portion 30 prior to entering the lower boss 44 of the backing portion 36.

The elements of the kit 4 are incorporated into the pop-up bait server 2 shown in FIG. 3. The bait server 2 includes the outer container 12, the inner container 14 and the latch mechanism 16. The outer container 12 or bucket 12 preferably includes a cover 50 and a rope 52 which is secured to the bucket 14 so as to enable one to carry the bucket 12. The cover 50 is connected to the rope 52 so that it is not easily separated from the bucket 12. The latch mechanism 16 is secured to the bucket 12 by passing the securing screws 32 and 34 through the latch portion 30 and into the upper and lower bosses 42 and 44 which are inserted into the bucket 12 in an appropriate position to receive the securing screws 32 and 34. The location of the latch mechanism 16 is such that the lip 46 is able to provide a ridge to catch and restrain an upper edge 54 of the inner wall 18 of the inner container 14 when the inner container 14 is placed inside the outer container 12 and is pressed down into water inside the outer container 12 and the upper edge 54 is engaged with the lip 46.

Referring now also to FIGS. 4-6, which illustrate cross sections of the pop-up bait server 2 shown in FIG. 3, the utility of the present invention is further elaborated. In FIG. 4 the outer container 12 is shown in cross section so that the water 56 inside can be seen. The inner container 14 has a plurality of water passage openings 26 in the inner wall 18 which is made in part of a mesh material 58 having a plurality of water passage openings 26 which allow water to pass into and out of the interior 22 of the inner container 14. When the upper edge 54 is disengaged from the lip 46 of the latch mechanism 16, the inner container 14 rises to a position on the surface 60 of the water 56 similar to that shown in FIG. 5. The inner container 14 rises because of the buoyancy of the bottom 20 of the inner container 14. The bottom 20 comprises a polystyrene foam material (Styrofoam ®) which has a specific gravity of less than about 1 and is therefore buoyant in water. The specific gravity of Styrofoam ® is sufficiently less than 1 to provide significant buoyancy to the inner container 14. It will be appreciated, however, that other materials which are buoyant in water, or have specific gravities of less that about 1, may also be used to provide a buoyant mechanism for the inner container 14. Alternate buoyant mechanisms include mechanisms which trap air in the structure of the inner container 14, preferably in the bottom 20 of the inner container. Such a mechanism may include foam type matrix similar to that of the preferred embodiment and may also include the incorporation of an enclosed compartment, or a plurality of compartments, within the inner container 14, preferably in the bottom 20 of the inner container 14, which contain matter which has a cumulative specific gravity of less than about 1. Preferred matter enclosed within such compartments would include, but not be limited to, various gases including air, and other matter or materials which could be combined to provide a cumulative specific gravity of less than about 1.

It will be appreciated that, although the inner container 14 may reside in the position shown in FIG. 4, the upper portion 68 of the inner container 14 is just as likely to tilt in the direction of the latch mechanism 16 because of the buoyancy of the bottom 20 in the water 56 contained in the outer container 12. It will be appreciated that the position of the inner container 14, shown in FIG. 4, is illustrative only and that the inner container 14 can adopt other positions within the outer container 12. Given the buoyancy of the bottom 20, the upper portion 68 of the inner container 14 is likely to tilt toward the latch mechanism 16 until the bottom 20 rests against the outer container 12 in a location opposite of the latch mechanism 16 (as shown in phantom in FIG. 4), because the bottom 20 will be forced to rise until it is completely restrained within the confines of the outer container 12.

When the inner container 14 is depressed in the water 56 in the outer container 12, and the upper edge 14 of the inner wall 18 is disengaged from the lip 46 of the latch mechanism 16, the inner container 14 can then freely rise in the water under biasing effect of the buoyant force created by the buoyancy of the bottom 20 of the inner container 14. When the inner container 14 is no longer restrained by the latch mechanism 16, and it is otherwise allowed to rise in the water 56 in the outer container 12, the water 56 in the interior 22 of the inner container 14 flows out of the interior 22 via water passage openings 26 in the mesh material 58 of the inner wall 18. It will be appreciated that a broad variety of known water passage mechanisms may be incorporated into the design of the inner container 14 to allow water to pass into and out of the interior 22 thereof. It is important, however, that the preferred mesh 58 have small enough openings 26 to prevent the live bait 62 from escaping from the interior 22 of the inner container 14. Live bait 62 can be introduced into the inner container 14 via the bait receiving opening 64 which also provides access to the interior 22 to enable one to reach in to select one's bait 62. The preferred inner container 14 prevents the live bait 62 from escaping as the water 56 passes out of the interior 22 as the inner container 14 rises to the surface 60 of the water 56. When the water 56 has substantially passed out of the interior 22 an individual may easily reach into the inner container, select from the live bait in the inner container 14, and then depress the inner container into the water 56 and engage the upper edge 54 of the inner container 14 with the ridge created by the lip 46 of the latch mechanism 16 to restrain the bottom 20 of the inner container 14 below the surface 60 of the water 56, thereby returning the live bait to their aqueous environment. It will be appreciated that a fisherman may simply push on the handle 28 to depress the inner container 14 enough to disengage the upper edge 54 from the latch mechanism 16 and then allow the inner container 14 to rise in order to select live bait 62. This may be done with one hand while the fisherman uses the other hand to hold the fishing line. Once the inner container 14 has been disengaged from the latch mechanism 16 and allowed to rise to the surface 60 of the water 56, the fisherman may then select bait 62 with the same hand which was used to manipulate the inner container 14. Once the bait 62 is selected, the same hand may then be used to depress the inner container 14 and reengage its upper edge 54 in the latch mechanism 16. In this way, bait 62 may be selected and retrieved from the Pop-Up Bait Server 2 of the present invention by manipulating the bait server 2 with a single hand, thereby freeing the other hand to hold the fishing line and/or a fishing rod.

It is to be understood, however, that even though numerous characteristics and advantageous of the present invention have been set forth in the foregoing description, together with details of the structure and function of the invention, the disclosure is illustrative, and changes in matters of order, shape, size, and arrangement of parts may be made within the principles of the invention and to the full extent indicated by the broad general meaning of the terms in which the appended claims are expressed.

What is claimed is:

1. A pop-up bait server for convenient delivery of live bait kept in water contained therein, said bait server comprising:

(a) an outer container having an inside;
(b) an inner container fitting at least partially inside said outer container, said inner container having an inner wall and an adjoining bottom which define an interior of said inner container, said inner container having water passage means for allowing water to pass through said inner container and into and out of said interior, said inner container having bait receiving means and buoyant means for buoying said inner container such that said interior will rise when unrestrained and under water; and (c) latch means for releasably restraining said inner container inside said outer container such that said interior is at least partially under water when said inner container is restrained in said outer container by said latch means and said outer container contains an amount of water sufficient to at least partially submerge said interior within said outer container, wherein said interior can contain live bait which resides in an aqueous environment in the water within said interior when said inner container is restrained by said latch means inside said outer container.

2. The pop-up bait server of claim 1 wherein said bait receiving means includes a bait receiving opening in said inner container.

3. The pop-up bait server of claim 2 wherein said water passage means includes a plurality of openings in said inner wall such that water can pass through said inner wall while bait can be retained in said interior when placed therein.

4. The pop-up bait server of claim 3 wherein said inner container includes handle means for manipulating said inner container.

5. The pop-up bait server of claim 1 wherein said latch means includes a lip which extends inward from an upper portion of said outer container so as to create a ridge inside said outer container sufficient to restrain an upper edge of said inner container when said inner container is inside said outer container and said outer container contains an amount of water sufficient to at least partially submerge said interior within said outer container.

6. The pop-up bait server of claim 1 wherein said said outer container is made of a foamed polystyrene material.

7. The pop-up bait server of claim 6 wherein said latch means include a screw and a backing portion including means for receiving said screw, said lip including a lip opening for receiving said screw, wherein said lip and said backing plate can be secured to said outer container with said screw.

8. The pop-up bait server of claim 7 wherein said latch means includes a plurality of screws, wherein at least one screw is passed through said lip opening and through said outer container and is received by said backing portion when said latch means is secured to said outer container, said backing portion including a plurality of bosses for receiving said screws.

9. The pop-up bait server of claim 1 wherein said bait server includes a cover for said outer container.

10. The pop-up bait server of claim 1 wherein said outer container includes carrying means for carrying said bait server.

11. The pop-up bait server of claim 10 wherein said carrying means includes a rope secured to said outer container.

12. The pop-up bait server of claim 1 wherein said buoyant means include a confined space wherein any and all matter within said confined space has a cumulative specific gravity effective to make the inner container buoyant in water.

13. The pop-up bait server of claim 12 wherein said buoyant means includes a synthetic polymer material having a specific gravity of less than about 1.

14. The pop-up bait server of claim 13 wherein said synthetic polymer material is a foamed polystyrene material.

15. A pop-up bait server kit for use with a receptacle which can be used as an outer container to receive and retain water, said kit comprising:

(a) an inner container sized to fit at least partially inside of the outer container and having an inner wall and an adjoining bottom which define an interior of said inner container, said inner container having water passage means for allowing water to pass through said inner container and into and out of said interior, said inner container having bait receiving means and buoyant means for buoying said inner container such that the interior will rise when unrestrained and under water; and (b) latch means for releasably restraining said inner container inside the outer container such that said interior is at least partially under water when said inner container is restrained inside the outer container by said latch means and the outer contains an amount of water sufficient to at least partially submerge said interior within the outer container, wherein said interior can contain live bait which resides in an aqueous environment in the water within said interior when said inner container is restrained by said latch means inside the outer container.

16. The pop-up bait server kit of claim 15 wherein said latch means include a lip which can be detachably attached to the outer container such that said lip can restrain said inner container when said inner container is placed inside the outer container and the outer container contains an amount of water sufficient to at least partially submerge said interior within the outer container.

17. The pop-up bait server kit of claim 16 wherein said latch means includes a lip which can be attached such that it extends inward from an upper portion of the outer container so as to create a ridge inside the outer container sufficient to restrain an upper edge of said inner container when said inner container is inside the outer container and the outer container contains an amount of water sufficient to at least partially submerge said interior within the outer container.

18. The pop-up bait server kit of claim 17 wherein said latch means includes a screw and a backing portion including means for receiving said screw, said lip including a lip opening for receiving said screw, wherein said lip and said backing portion can be secured to the outer container with said screw.

19. The pop-up bait server kit of claim 18 wherein said latch means includes a plurality of screws, wherein at least one screw is passed through said lip opening, through the outer container, and is received by said backing portion when said latch means are secured to the outer container, said backing portion including a plurality of bosses for receiving said plurality of screws.

20. The pop-up bait server kit of claim 15 wherein said water passage means includes a plurality of openings in said inner wall such that water can pass through said inner wall while bait can be retained in said interior when placed therein.

21. The pop-up bait server kit of claim 15 wherein said inner container includes handle means for manipulating said inner container.

22. The pop-up bait server kit of claim 15 wherein said buoyant means include a confirmed space wherein any and all matter within said confined space has a cumulative specific gravity effective to make the inner container buoyant in water.

23. The pop-up bait server kit of claim 22 wherein said buoyant means includes a synthetic polymer material having a specific gravity of less than about 1.

24. The pop-up bait server kit of claim 23 wherein said synthetic polymer material is a foamed polystyrene material.

25. A method of assembly for making a pop-up bait server for convenient delivery of live bait kept in water contained therein, said method comprising the steps of:
  (a) providing:
    (i) an inner container sized to fit at least partially inside of a receptacle used as an outer container to receive and retain water said inner container having an inner wall and an adjoining bottom which define an interior, said inner container having water passage means for allowing water to pass through said inner container and into and out of said interior, said inner container having bait receiving means and buoyant means for buoying said inner container such that the interior will rise when unrestrained and under water; and
    (ii) latch means for releasably restraining said inner container inside the outer container when attached thereto; and
  (b) detachably attaching said latch means to the outer container such that said latch means can releasably restrain said inner container inside the outer container when the inner container is placed inside the outer container and the outer container contains an amount of water sufficient to at least partially submerge said interior within the outer container and such that live bait can be sustained in an aqueous environment in the water in said interior when said inner container is so restrained.

* * * * *